(12) United States Patent
Sherf

(10) Patent No.: US 8,172,138 B2
(45) Date of Patent: May 8, 2012

(54) DEVICE AND METHOD FOR SMART CARD ASSISTED DIGITAL CONTENT PURCHASE AND STORAGE

(75) Inventor: Pinhas Sherf, Bnei Brak (IL)

(73) Assignee: Aser Rich Limited, London (GB)

( * ) Notice: Subject to any disclaimer, the term of this patent is extended or adjusted under 35 U.S.C. 154(b) by 536 days.

(21) Appl. No.: 12/442,205

(22) PCT Filed: Sep. 20, 2007

(86) PCT No.: PCT/IL2007/001162
§ 371 (c)(1),
(2), (4) Date: Mar. 20, 2009

(87) PCT Pub. No.: WO2008/035346
PCT Pub. Date: Mar. 27, 2008

(65) Prior Publication Data
US 2010/0019034 A1  Jan. 28, 2010

(30) Foreign Application Priority Data
Sep. 21, 2006 (IL) .......................................... 178262

(51) Int. Cl.
*G06K 5/00* (2006.01)

(52) U.S. Cl. ......... 235/382; 235/492; 235/487; 235/375

(58) Field of Classification Search .................. 235/382, 235/492, 380, 382.5, 375, 487
See application file for complete search history.

(56) References Cited

U.S. PATENT DOCUMENTS

| 5,530,232 | A  | * | 6/1996 | Taylor ........................... 235/380 |
| 7,016,496 | B2 |   | 3/2006 | Koch |
| 7,024,226 | B2 |   | 4/2006 | Sandberg et al. |
| 2004/0050930 | A1 | * | 3/2004 | Rowe ............................ 235/380 |
| 2005/0212657 | A1 | * | 9/2005 | Simon .......................... 340/5.74 |
| 2006/0102717 | A1 |   | 5/2006 | Wood et al. |

OTHER PUBLICATIONS

International Search Report mailed Aug. 20, 2008 for PCT/IL07/01162 filed Sep. 20, 2007.
Written Opinion mailed Aug. 20, 2008 for PCT/IL07/01162 filed Sep. 20, 2007.
International Preliminary Report on Patentability published Apr. 22, 2009 for PCT/IL2007/01162 filed Sep. 20, 2007.

* cited by examiner

*Primary Examiner* — Karl D Frech
(74) *Attorney, Agent, or Firm* — The Law Office of Michael E. Kondoudis

(57) ABSTRACT

The present invention discloses a device and a method useful for the provision of secure payment and certification of digital content access, while the devise comprises: at least one IC chip containing an operating system and memory provisions; an interface of a plurality of N plated electrical input contacts (PEICs); interconnected to said IC chip; N is an integer number equal or higher than 1; and, at least one operating system able to process information and recall it, stored on said IC chip; at least one encoding mathematical formula stored on said IC chip that generates a response to input provided by entering a prescribed sequence of electrical inputs to said PEICs by means of said card reader; at least one human interface that prompts the end user to enter data and enables the entry of said data, e.g., by means of an interconnected keypad.

16 Claims, 2 Drawing Sheets

DEVICE AND METHOD FOR SMART CARD ASSISTED DIGITAL CONTENT PURCHASE AND STORAGE

FIELD OF THE INVENTION

The present invention generally pertains to an improved device and method for smartcard assisted digital content purchase and storage.

BACKGROUND OF THE INVENTION

Smart cards and Subscriber Identity Module (SIM) cards incorporate an embedded Integrated Circuit (IC) chip that is often utilized to enforce access control to the data on the card. Microprocessor cards can store information, carry out local processing on the data stored, and perform complex calculations. These cards are of credit card dimensions and take the form of either "contact" cards which require a card reader or "contactless" cards which use radio frequency signals to operate. In terms of processing power older version cards use an 8-bit micro-controller clockable up to 16 MHz with or without co-processor for high-speed encryption. The current trend is toward customized controllers with a 32-bit RISC processor running at 25 to 32 MHz. The memory capacity of such cards is dependent on data compression techniques and is constantly on the rise.

The most common smart card and SIM card applications are: cellular phones, credit cards, electronic cash, computer security systems, wireless communication, loyalty systems (like frequent flyer points), banking, satellite TV, government identification. Smart cards can be used with a smart-card reader attachment to a personal computer to authenticate a user. Web browsers also can use smart card technology to supplement Secure Sockets Layer (SSL) for improved security of Internet transactions.

The growing memory capacity on smart cards and SIM cards, as well as the ability to control access to the media stored on them has prompted their use for the purchase or temporary rental of media and software. U.S. Pat. No. 7,016,496 discloses a system and method for securing the copyright of purchased material by providing an encryption key to the smart card thereby restricting access to verified purchasers of the content, with the content either being stored on an online server or locally on the card. Moreover, the card may double as both an access restriction solution and as payment identity verification as described in U.S. Pat. No. 7,024,226.

Although the current art uses encryption methods in order to deter unauthorized access to the data stored on the card. Security on such cards could still be improved.

Additionally, as the cards become more popular for transactions and content access/storage, their lack of provisions to counter card theft and deal with the demands of subscription services emerges.

SUMMARY OF THE INVENTION

It is one object of the present invention to present a device useful for the provision of secure payment as well as well as the certification of digital content access, comprising at least one IC chip containing an operating system as well as memory provisions, interconnected to an interface of any number of plated electrical input contacts, at least one other means to encode a prescribed sequence to be applied to the plated electrical contacts, and at least one encoding mathematical formula stored on the IC chip to generate an access code to be matched with a prescribed access code.

It is in the scope of the present invention wherein prescribed sequence is preferably embedded in analog format on a plastic card in which the IC chip is embedded. The prescribed sequence is preferably encoded in a magnetic strip of the face of a plastic card in which the IC chip is embedded. The prescribed sequence is preferably encoded on an additional secondary IC chip embedded in a plastic card in which the primary IC chip is embedded. The secondary chip is preferably detected and communicated with by the reader by means of RF frequency. The secondary IC chip is preferably symmetrically located on the plastic card at the opposite end of the card containing the primary IC chip. The secondary IC chip is preferably symmetrically located on the opposite face of the plastic card containing the primary IC chip. Failure to provide the correct sequence of electrical inputs preferably causes the deactivation of the card. The deactivation preferably affects the use of the card as a payment means. The deactivation preferably affects the use of the card as a digital content storage means. The deactivation preferably is achieved by an instruction to the operating system within IC chip to format the entire chip including the operating system. The deactivation is preferably achieved by an instruction to erase the data stored on the chip. The deactivation is preferably achieved by an instruction to erase the access enabling codes stored on the chip. The deactivation feature is preferably applied either to the entire card or for content therein in order to restrict the duration of access to the cards contents. The card preferably reactivated by means of retrieving a sequence from the card provider. The sequence is preferably entered locally by means of the card reader. The sequence is preferably entered remotely by the provider of the card. The sequence is preferably a combination of locally and remotely provided input.

Another object of the present invention is to provide a method for authenticating the use of smartcards and authorizing the access to the content stored therein, by verifying that the sequence of electrical signals applied to electrical contacts embedded into a smartcard and interconnected to an IC chip, or the code generated by the chip as a response to said sequences, is matching to the sequence separately encoded upon the smart card.

It is in the scope of the present invention wherein the sequence of electrical inputs by a card reader from an analogical imprint on a plastic card containing the IC chip. The sequence of electrical inputs provided by a card reader from a magnetic strip is preferably imprinted on a plastic card containing the IC chip. The method may comprise a step or steps of attaining the sequence of electrical inputs by a card reader from a secondary IC chip imbedded in the plastic card containing the primary IC chip. The secondary chip is preferably detected and communicated with by the reader by means of RF frequency. The secondary IC chip is preferably symmetrically located on the plastic card at the opposite end of the card containing the primary IC chip. In which the card reader prompts the user to reverse the card for verification procedure. The secondary IC chip is preferably symmetrically located on the opposite face of the plastic card containing the primary IC chip. In which the card reader prompts the user to flip the card for verification procedure.

Another object of the present invention is to provide a method for deactivating a smart card by matching data on two independent data storage means on the card. The deactivation is preferably triggered by a combination of data stored on the card on two independent storage means and data entered locally via a card reader interface. The deactivation is preferably triggered by a combination of data stored on the card on two independent storage means and received remotely via the card reader's connection to a network. The deactivation is preferably triggered by a combination of data stored on the card on two independent storage means, locally via a card reader interface, and received remotely via the card reader connection to a network.

Other objects of the present invention are to disclose a method for deactivating the smart card to payments; a method for deactivating the smart card for content storage; and/or a method for deactivating the smart card for content access.

The deactivation is preferably achieved by formatting the entire chip including the operating system. The deactivation is preferably achieved by erasing the data stored on the chip. The deactivation is preferably achieved by erasing the access enabling codes stored on the chip. The deactivation feature is preferably applied either to the entire card or for content thereby restricting the duration of access to the cards contents.

Another object of the present invention is to disclose a method reactivating a deactivated card by retrieving a sequence from the card provider. The reactivation is preferably achieved by entering a sequence locally by means of a keypad on the card reader. Alternatively, reactivation is preferably achieved by receiving a sequence remotely through a network enabled card reader. Alternatively, the reactivation is achieved by a combination of entering a sequence locally and receiving one remotely.

BRIEF DESCRIPTION OF THE DRAWINGS

In order to understand the invention and to see how it may be implemented in practice, a plurality of embodiments will now be described, by way of non-limiting example only, with reference to the accompanying drawings, in which.

DETAILED DESCRIPTION OF PREFERRED EMBODIMENTS

Figure 1:
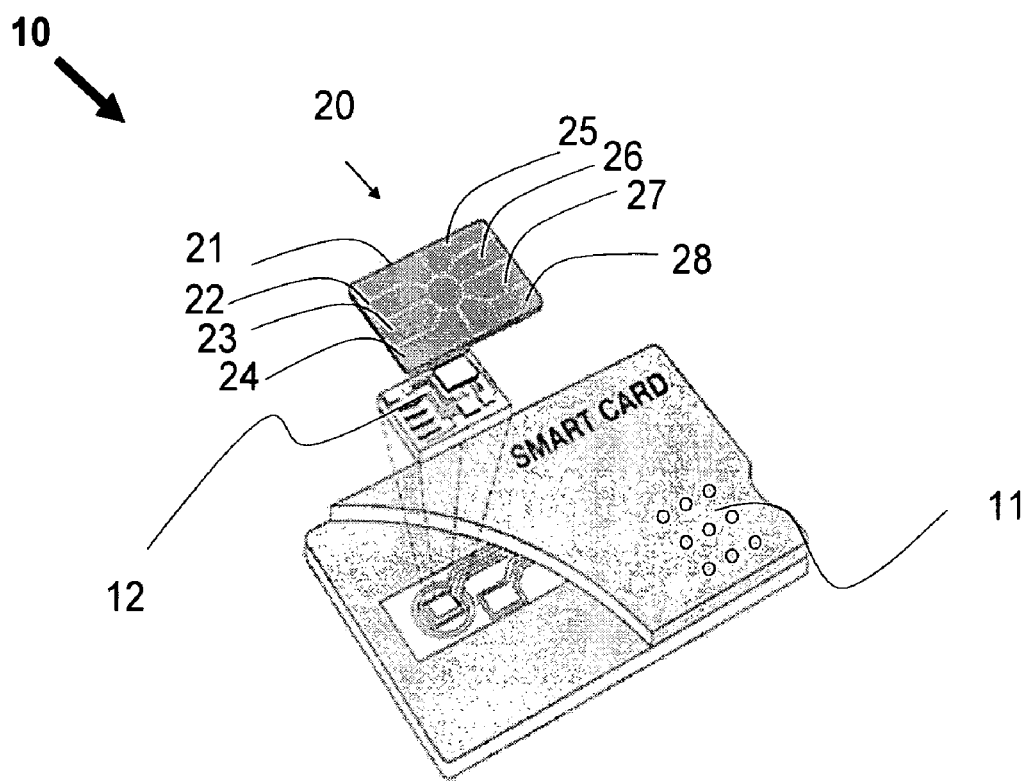
FIG. 1 is an exploded view of a smartcard incorporating an IC chip and embedded with a prescribed lock sequence. The prescribed lock sequence is utilized to either partially or completely restrict access to the content of the card; and, FIG. 2 is a schematic representation of the method of provisioning secure payment and certifying access to digital content by authenticating the us of a smartcard and authorizing it to the content stored therein.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide an improved device and method for smartcard assisted digital content purchase and storage.

The device and method of the present invention are useful for increasing the penetration of IC chip assisted commerce activity. It enhances the security of both transaction and purchased content access. Additionally it increases consumer confidence in the use of smartcards both as means of transaction and payment transfer as and as theft and loss proof means to access purchased digital content.

The term 'Secure payment' refers hereinafter to an electronic form of payment that authenticates the card used for payment. Such as authorization codes printed on the reverse side of credit cards or integrated within circuitry imbedded in smartcard enabled bank cards.

The term 'smart card' refers hereafter to plastic cards shaped in the form of credit cards embedded with integrated electronic circuitry that allows to store information, carry out local processing on the data stored, and also perform complex calculations.

The term "IC chip" refers to the integrated circuitry chip, typically embedded within a plastic card with capacity to receive, process and relay data, as well as store data for later retrieval.

The term 'operating system' refers hereinafter to a set of computer instructions that manage computer memory and computation capacities. Such as operating system provided on personal computers and electronic devices.

The term 'card reader' refers hereinafter to an apparatus that is able to communicate with the IC chip imbedded in a smart card. It can be used to relay information from the card to a display fitted on the card reader, relay information to a remote location, and enter information into the cards memory either by local or by remote input.

The term "PEICs" refers hereafter to a set of plated electrical input contacts interconnected to the IC chip and providing the electrical interface for conveying data relayed by the card reader.

The term 'primary IC chip' refers hereinafter to the IC chip on which the operating system resides and data is processed and stored.

The term 'secondary IC chip' refers hereinafter to an additional IC chip that is used to store data utilized for independent verification and authentication of the card.

The term 'locally' refers hereinafter to an action of data entry taken by the user in proximity to a device, such as the entering of a code on a keypad fitted device.

The term 'remotely' refers hereinafter to an action of data entry achieved by transmission of the data from a remote location to the proximity of the user and device, such as the transfer of data from a remote computer to be stored or processed by the local card or device.

In a preferred embodiment of the invention a plastic card of credit card dimensions is fitted with at least one IC chip and at least one other means of data storage for authenticating the card to a card reader. The card is further provided with the ability to deactivate itself by partially or entirely erasing either the data or the access codes to data stored on it. The authentication process is achieved by either directly comparing a prescribed access sequence to a sequence entered locally or remotely, or by comparing a sequence generated by the primary IC chip in response to an electrical input sequence generated from an input code.

It would be desirable to achieve a device and method enhancing the current encryption access to card details, incorporating counter theft and misuse provisions, and providing time restricted access to content. Such improvements would especially be useful if smartcards and SIM cards are to be utilized as commonplace combined payment and user authentication methods for the access to digital content. The enhanced encryption and the versatility of access duration build confidence in content providers and enables offering trial period access as well as subscription services. By enabling shutdown of the card user confidence and satisfaction is assured, as in the case of theft or loss the old card is deactivated and a new one may be issued without the loss of privileges, services or content purchased for the old card.

In a preferred embodiment of the invention security is enhanced by encoding a lock sequence embedded on the card but not on the primary IC chip, which is on a magnetic strip, in analog form or on an additional secondary IC chip. The operating system embedded in the primary IC chip on the smartcard awaits the entry of a sequence of electrical signals to the seven or more contacts of its plated surface. Subsequently prior to granting access to stored data the card reader verifies that this sequence matches the data in the encoded lock sequence.

In yet another preferred embodiment radio frequency (RF) based contact-free IC chip communication technology is utilized, enabling the powering and communication of the smartcard without the need for physical contact with a smart card reader.

In yet another preferred embodiment of the invention should the access sequence provided be incorrect the card is deactivated.

In yet another preferred embodiment of the invention deactivation of the card is achieved by a reset or format of the entire contents of the card.

In yet another preferred embodiment of the invention deactivation is achieved by erasing elements of the operating system necessary to gain access to either the cards data content or remote content.

In yet another preferred embodiment of the invention deactivation is achieved by erasing the data content of the card but not the operating system.

In yet another preferred embodiment of the invention the deactivation features also double as access duration control to content, either erasing the data itself or erasing codes necessary to access the data.

In yet another preferred embodiment of the invention the entire card or access to content may be reactivated by retrieving the access sequence from the content provider and entering it manually.

In yet another preferred embodiment of the invention the entire card or access to content may be reactivated by retrieving the access sequence from the content provider and entering it via remote server.

The device and method of the present invention has many technology advantages, among them:

Enhanced encryption of card data.
Versatile accessibility restrictions to content.
Theft or loss remote shutdown and reactivation of card.

Additional features and advantages of the invention will become apparent from the following drawings and description.

Figure 2:
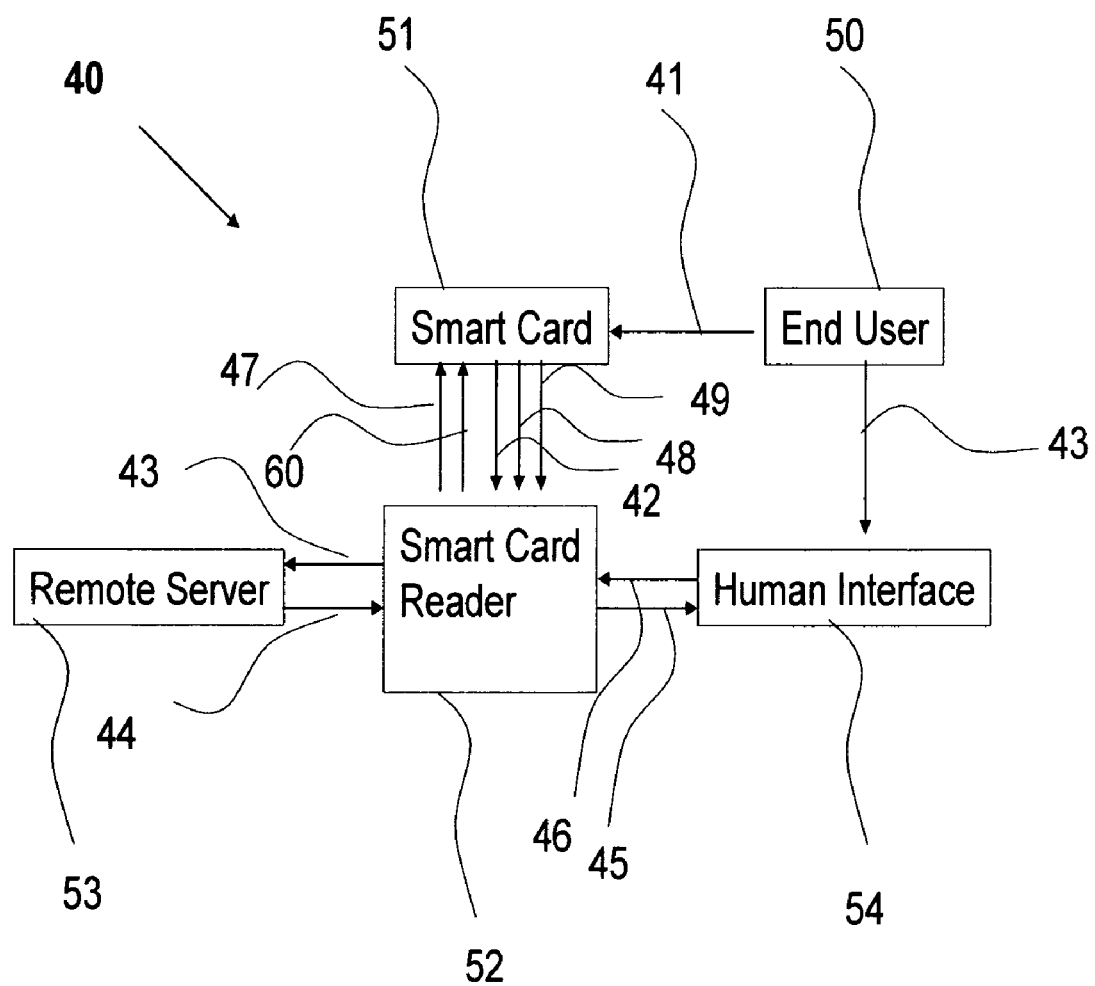

FIG. 1 is an exploded view of a preferred embodiment of the invention 10. In which access to content on IC chip 12 is restricted by a sequence of electrical signals to be applied to contact plates 21-28 by card reader (not shown) and derived from embedded analog encoding 11. The card reader (not shown) compares the sequences of electrical inputs or alternatively a coded response to said sequence generated by IC chip 12 with a digital representation that it derives from analog encoding 11. Should these not match the card reader instructs the IC chip by means of a sequence of electrical inputs to plates 21-28 that the card is to be deactivated. Subsequently IC chip 12 either partially or completely formats the data it contains. FIG. 2 is a schematic representation of a preferred method 40 of certifying access to digital content by authenticating the use of a smartcard and authorizing it to the content stored therein. Wherein the end user 50 having obtained smart card 51, brings 42 card 51 into interface 41 with smart card reader 52, said interfacing 41 resulting in the obtainment 42 of identification data from card 51, triggering the transmission 43 of said data to remote server 53 and the verification 44 of the card 51 to card reader 52 by remote server 53. Upon receiving verification 44 the smart card reader prompts 45 the entry of a code on a display incorporated within human interface 54. Consequently end user 50 types a code on a keypad (not shown) incorporated with human interface 54. Said code is transmitted 46 to card reader 52 that converts it into an electrical sequence. Said electrical sequence is applied 47 by to the plated electrical input contacts (PEICs) that are interconnected to a primary IC chip (not shown) embedded card 51. The operating system stored on said IC chip processes the input sequence and generates a response code that is transmitted 48 to card reader 52. Said response code is combined by card reader 52 with an additional code that is retrieved by card reader 52 off a secondary IC chip (not shown) imbedded in card 51. Said combined code is converted by card reader 52 into an electrical sequence that is applied 60 to the PEICs that are interconnected to a primary IC chip (not shown). Said IC chip processing the input and entering it into an unlocking mathematical formula stored on said IC chip. Should the formula result match the anticipated result stored on the primary IC chip, the operating system on said chip enables access to the digital content pre-stored on the primary IC chip.

The invention claimed is:

1. A system for granting access to data stored on a smartcard, comprising:
   a. at least one smartcard reader;
   b. at least one smartcard comprising
      i. at least one IC chip containing an operating system and memory provisions for storing digital content;
      ii. an interface of a plurality of N plated electrical input contacts (PEICs); interconnected to said IC chip; N is an integer number equal or higher than 1; and,
      iii. at least one operating system able to process information and recall it, stored on said at least one IC chip
      iv. at least one encoding mathematical formula stored on said IC chip that generates a response to input provided by entering a prescribed sequence of electrical inputs to said PEICs by means of said card reader; and,
      v. at least one human interface that prompts the end user to enter data and enables the entry of said data;
   c. digital media content stored on said memory provisions; wherein said operating system enables secure payment for, and certification of access to, digital content such that trial period access as well as subscription services to said pre-loaded content may be offered.

2. The system of claim 1 wherein the prescribed sequence is encoded in analog format on a plastic card in which the IC chip is embedded or encoded in a magnetic strip of the face of a plastic card in which the IC chip is embedded furthermore wherein the prescribed sequence is encoded on an additional secondary IC chip embedded in a plastic card in which the primary IC chip is embedded.

3. The system of claim 2 wherein the secondary chip is detected and communicated by the reader by means of RF frequency, further wherein the secondary IC chip is symmetrically located on the plastic card at the opposite end of the card containing the primary IC chip or on the opposite face of the plastic card containing the primary IC chip.

4. The system according to claim 1, additionally comprising an encryption means for encrypting said content or otherwise preventing unauthorized access to it wherein said digital content is selected from a group consisting of: music, video, electronic games, electronic books, electronic magazines, software, or a combination thereof.

5. The system according to claim 1, additionally comprising an information relay means interconnected to said smartcard reader, said relay means adapted for two-way data communication with a remote server.

6. A method of provisioning secure payment and certifying access to digital content by authenticating the use of a smartcard and authorizing the access to the content stored therein, said method comprising:
   a. obtaining a system for licensed retrieval of media content stored on a smartcard, comprising:
      i. at least one smartcard reader;
      ii. at least one smartcard comprising at least one IC chip containing an operating system and memory provisions for storing digital content; an interface of a plurality of N plated electrical input contacts (PEICs); interconnected to said IC chip; N is an integer number equal or higher than 1; and,
         at least one operating system able to process information and recall it, stored on said at least one IC chip
         at least one encoding mathematical formula stored on said IC chip that generates a response to input provided by entering a prescribed sequence of electrical inputs to said PEICs by means of said card reader;
      iii. media content stored on said memory provisions; and,
   b. interfacing said device with a smartcard reader device capable of reading and writing to the IC chip embedded in said smartcard, by means of the PEIC's interconnected to said chip;
   c. identifying said smartcard by information obtained from said card by said card reader and in a preferred embodiment of the invention transmitting said identification data to a remote server;
   d. prompting the end user to enter a prescribed code by means of said human interface incorporated in said smartcard reader;
   e. entering a code sequence, e.g., by means of a keypad incorporated in said card reader device;
   f. converting said code sequence, by said card reader into an electrical contact sequence to be applied to said PEIC's interconnected to said chip;
   g. reconverting said electrical code sequence into a numerical code sequence by said operating system stored on said chip;
   h. generating a response to said numerical code sequence by applying said numerical code sequence to an encoding mathematical formula stored on said chip;
   i. authenticating said response either by comparing it to, or processing it with, information stored locally, e.g., encoded analogically or digitally on said smartcard, or by comparing it to, or processing it with, information held on said remote server;
   j. specifying the service required either by means of said human interface incorporated in said card reader or by other interconnected computerized apparatus;
   k. authorizing the availability of said specified service to said identified and authenticated card;
   l. enabling or disabling the specified service on said card's IC chip; and,
   m. deducting credit for said services, either directly from credits stored on said card or by interfacing with conventional banking direct debt or credit services.

7. A method of provisioning secure payment and certifying access to digital content by authenticating the use of a smartcard and authorizing the access to the content stored therein, said method comprising:
   a. obtaining a smartcard device for the provision of secure payment as well as well as the certification of digital content access, comprising
      i. at least one IC chip containing an operating system as well as memory provisions,
      ii. an interface of a plurality of N plated electrical input contacts (PEICs); to said IC chip; N is any integer number equal or higher 1; and,
      iii. at least one operating system able to process information and recall it, stored on said IC chip
      iv. at least one encoding mathematical formula stored on said IC chip that generates a response to input provided by entering a prescribed sequence of electrical inputs to said PEICs by means of said card reader;
      v. at least one human interface that prompts the end user to enter data and enables the entry of said data, e.g., by means of an interconnected keypad;
   b. interfacing said device with a smartcard reader device capable of reading and writing to the IC chip embedded in said smartcard, by means of the PEIC's interconnected to said chip;
   c. identifying said smartcard by information obtained from said card by said card reader and in a preferred embodiment of the invention transmitting said identification data to a remote server;
   d. prompting the end user to enter a prescribed code by means of said human interface incorporated in said smartcard reader;
   e. entering a code sequence, e.g., by means of a keypad incorporated in said card reader device;
   f. converting said code sequence, by said card reader into an electrical contact sequence to be applied to said PEIC's interconnected to said chip;
   g. reconverting said electrical code sequence into a numerical code sequence by said operating system stored on said chip;
   h. generating a response to said numerical code sequence by applying said numerical code sequence to an encoding mathematical formula stored on said chip;
   i. authenticating said response either by comparing it to, or processing it with, information stored locally, e.g., encoded analogically or digitally on said smartcard, or by comparing it to, or processing it with, information held on said remote server;
   j specifying the service required either by means of said human interface incorporated in said card reader or by other interconnected computerized apparatus;
   k. authorizing the availability of said specified service to said identified and authenticated card;
   l. enabling or disabling the specified service on said card's IC chip; and,
   m. deducting credit for said services, either directly from credits stored on said card or by interfacing with conventional banking direct debt or credit services.

8. The method of claim 7 wherein failure to provide the correct sequence of electrical inputs results in disabling the card to payments or storage of digital content or access of stored digital content further wherein the step of disabling said card is provided by preprogramming said operating system within said IC chip to format the entire chip including said operating system or by preprogramming said operating system within said IC chip to erase the data stored on the chip or by preprogramming said operating system within said IC chip to erase the access enabling codes stored on the chip.

9. The method of claim 8 in which restricting the duration of access to the card's contents is achieved by verifying the validity of said entered sequence against a log of the first date of access and the length of access authorization and wherein the card is re-enabled by means of retrieving a sequence from the card provider, to be utilized in the case the user has forgotten the original enabling code sequence.

10. The method of claim 9 wherein entering the sequence is provided locally by means of the card reader after having been obtained from the service provider or entering the sequence is provided remotely by the provider of the card or entering the sequence is a combination of locally and remotely provided input.

11. The method of claim 7 wherein authenticating the correct sequence of electrical inputs is achieved by comparing it with data read by a card reader from an analogical imprint on a plastic card containing the IC chip or by comparing it with data read by a card reader from a magnetic strip imprinted on a plastic card containing the IC chip.

12. The method of claim 7 wherein authenticating the correct sequence of electrical inputs is achieved by comparing it with data read by a card reader from a secondary IC chip imbedded in the a plastic card containing the primary IC chip further wherein the secondary chip is detected and communicated with by the reader by means of RF frequency.

13. The method of claim 12 wherein the secondary IC chip is symmetrically located on the plastic card at the opposite end of the card containing the primary IC chip in which the card reader prompts the user to reverse the card for verification procedure.

14. The method of claim 13 wherein said secondary IC chip is symmetrically located on the opposite face of the plastic card containing the primary IC chip in which the card reader prompts the user to flip the card for verification procedure.

15. The method according to claim 7, additionally comprising steps of
   a. obtaining a user unique prepaid purchasing credit
   b. loading said memory provisions with said prepaid purchasing credit data and
   c. storing said prepaid purchasing credit on a remote server.

16. The method according to claim 15, additionally comprising a step selected from a group comprising of deducting credit from said prepaid purchasing credit once said decipher code is provided, deducting credit from said prepaid purchasing credit once said code sequence is communicated, periodically deducting a flat rate from said credit in exchange for unlimited access to a plurality of said code sequences and deducting credit from said prepaid purchasing credit once said controlled access has been retracted.

* * * * *